United States Patent [19]
Cao et al.

[11] Patent Number: 4,794,538
[45] Date of Patent: Dec. 27, 1988

[54] METHOD TO CONTROL THE OPERATION OF WHEELS OF A VEHICLE TO PREVENT SLIPPING OR SKIDDING, AND BRAKE LOCKING

[75] Inventors: Chi-Thuan Cao, Korntal; Helmut Janetzke, Schwieberdingen; Alfred Schulz, Oberriexingen; Harald Michi, Ölbronn-Dürn, all of Fed. Rep. of Germany

[73] Assignee: Robert Bosch GmbH, Stuttgart, Fed. Rep. of Germany

[21] Appl. No.: 915,711

[22] Filed: Oct. 6, 1986

[30] Foreign Application Priority Data
Oct. 8, 1985 [DE] Fed. Rep. of Germany ....... 3535843

[51] Int. Cl.[4] .............................................. B60T 8/32
[52] U.S. Cl. .............................. 364/426.02; 180/197; 303/95; 364/426.03
[58] Field of Search ....................... 364/426; 180/197; 361/238; 303/95

[56] References Cited
U.S. PATENT DOCUMENTS

| | | | |
|---|---|---|---|
| 3,614,173 | 10/1971 | Branson | 364/426 |
| 3,718,374 | 2/1973 | Ochia | 364/426 |
| 4,336,592 | 6/1982 | Beck | 364/426 |
| 4,344,139 | 8/1982 | Miller et al. | 180/197 |
| 4,392,202 | 7/1983 | Matsuda | 364/426 |

Primary Examiner—Gary Chin
Attorney, Agent, or Firm—Frishauf, Holtz, Goodman, Woodward

[57] ABSTRACT

Wheel speed ($V_R$) and braking pressure ($P_B$) applied to a wheel are continuously measured and utilized to estimated values from a mathematical system model, to obtain the physical values: coefficient of friction ($\mu$), vehicle speed ($V_F$), slope of a slip curve ($d\mu/dS$), slip (S), and coefficient of friction of a stationary-rotary brake couple structure. At least one of the physical values so obtained, and preferably the coefficient of friction ($\mu$), vehicle speed, and slope of wheel slip curve are used to control braking pressure being applied to the wheel. Braking pressure can be controlled for example for braking in accordance with coefficient of friction and slope of the friction-slip curve, for example to operate the wheel just before the coefficient of friction drops as the wheel begins to slip. Spinning of a wheel can be avoided by controlling the braking pressure to be below slippage value.

17 Claims, 3 Drawing Sheets

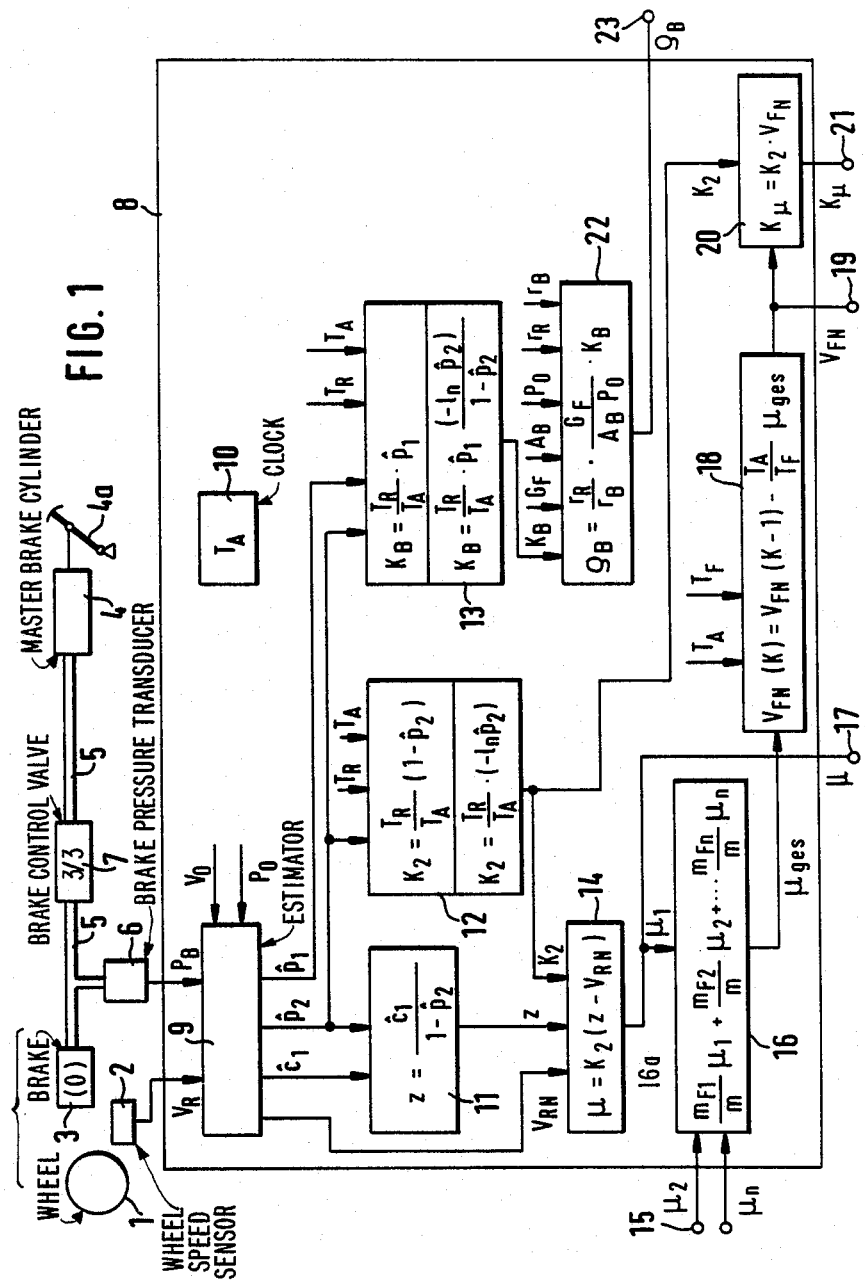

METHOD TO CONTROL THE OPERATION OF WHEELS OF A VEHICLE TO PREVENT SLIPPING OR SKIDDING, AND BRAKE LOCKING

The present invention relates to a method to control the operation of one or more wheels of a vehicle, for example driven wheels, in which the coefficient of friction between the circumference of the wheel and a roll-off surface, for example a road surface, or sand, snow and the like on a road surface is determined, so that a braking control system, such as an anti-brake locking system (ABS) or an anti-slip regulating system (ASR) can respond properly in the light of determined friction between the wheel and the rolling-off surface.

In the past, it was not readily possible to determine the coefficient of friction between the wheel and a surface, and wheel slip with apparatus and electronic computation systems which were economical and inexpensive enough for combination with an ABS or ASR system. An ABS and ASR system can be combined in one unit for controlling not only the braking effort when an operator steps on a brake pedal, but also for controlling a vehicle brake which is applied by the ASR system to a driven wheen when spinning or a tendency to spin is sensed. The usually currently commercially used ABS senses wheel deceleration, wheel acceleration and/or wheel slip signals. To determine wheel slip, and obtain a wheel slip signal, vehicle speed must be known which is derived from wheel speed signals, for example signals obtained from all wheels of a vehicle, whether rolling or driven, or the like. Such a derived vehicle speed signal forms an approximation. The control of the braking effort, thus, is not necessarily an optimum.

THE INVENTION

It is an object to provide a method in which the frictional coefficient $\mu$, and/or other and important physical values are obtained utilizing parameters or measured values which can be easily obtained from a vehicle. Braking effort control is then based on the determined coefficient of friction, in such a way that a wheel will not lock and also will not spin, and that, if locking or spinning does occur, rapid and optimum reaction by the system to eliminate locking or spinning, respectively, can be commanded.

Briefly, both braking pressure $P_B$ and rolling speed $V_R$ of a respective wheel is continuously sensed to obtain respective signals, representative of the respective instantaneous braking pressure and rolling wheel speed. "Rolling wheel speed" is here defined to mean the speed of a wheel which runs on a rolling-off surface, which may be a road, but need not be a road surface; it may be snow, sand, or other support configurations having rapidly varying and widely different coefficients of friction. From the continuously measured braking pressure $P_B$ and the wheel speed $V_R$, instantaneous values of at least one of the following physical values are derived:

$\mu$, the coefficient of friction between the wheel surface and the roll-off surface of the wheel;

$V_F$, the vehicle speed;

S, slippage of the wheel with respect to the roll-off surface;

$d\mu/dS$, slope of a wheel slip curve;

$\rho_B$, coefficient of friction of a brake structure.

The level of braking pressure being applied to the wheel, based on at least one of the so determined values, and typically at least on the $\mu$ values, is then used to control braking of the respective wheel.

In accordance with a feature of the invention, the step of determining the at least one physical value, is carried out without reference to statistically based values of any of a group of parameters, but, rather, by constructing maythematical models from which the parameters can be determined. Thus, (1) a mathematical model is constructed for wheel speed which includes mathematical parameters representing, implicitly, at least the physical values: coefficient of friction $\mu$, vehicle speed $V_F$, slippage S, change in frictional coefficient with respect to change in slippage $d\mu/dS$, and coefficient of friction of a brake couple structure $\rho_B$;

(2) At predetermined strobing intervals or instances K, and subsequent intervals, e.g. K+1, the mathematical model parameters are established by utilizing the measured values of braking pressure $P_B$ and of wheel speed $V_R$, in accordance with well known identification. This is done without a priori statistical characteristics of the physical values; and (3) at least one of the physical values of (1) on the estimated mathematical model parameters are then determined.

The calculations can easily be carried out in an electronic calculator in accordance with formulae which characterize respective relationships of the respective values and parameters, including, for example, the inertial torque of the wheel, vehicle weight, diameter of the wheel, and the like.

The coefficient of friction $\rho_B$ of the brake structure, as used herein, is the coefficient of friction of a brake couple in a wheel, having a stationary part, for example a brake shoe or a brake pad, cooperating with a rotary part, for example a brake drum, or a brake disk, respectively. Since the system is applicable to all kinds of brakes, whether of the drum, disk, circumferential or other type, the term "brake structure" is used herein to generically define any suitable brake. The present invention is not concerned with the structure of the brake as such, only with the coefficient of friction during operation of the brake.

Vehicle speed can be calculated by determining a vehicle speed at a given instant and, at a subsequent instant, considering the duration between the prior and subsequent instant and the force of gravity. The slope of the slip curve, that is, a curve which graphically represents the change in coefficient of friction with respect to wheel slip can be determined, likewise, by considering vehicle speed and time. The curve initially rises—friction increases with increasing slip until a wheel will spin through, at which time the coefficient of friction will drop rapidly. The present invention permits operation of the brake controlling a wheel just short of spinning or of slipping, so that the maximum coefficient of friction on which the braking effort can be applied can be used.

The determined coefficient of friction can be used to directly control the braking pressure, for optimum response, to prevent wheel locking. Knowing the exact vehicle speed improves the operation of a clip control unit, or of an anti-locking system (ABS). Knowing the value of the slope of the frictional coefficient, at a specific instant—related to the rotation of the wheel, of course—improves the operation of a slip control system since it is then possible to optimally control braking pressure applied to driven wheel, and thus controlling the slip, that the driven wheel will operate at an optimal operating point of the clip curve. This optimum point, as known, is slightly in advance of the maximum of the slip curve, that is, on a graph, thus slightly to the left of the maximum of the slip curve, at which the slope of the wheel speed slip curve will become horizontal or zero. It is, therefore, desirable to provide a small positive comparison value so that the system will respond just before the maximum of the curve is actually used. The system, also, provides the possibility to consider the relative frictional coefficient of the brake structure couple, that is, to compute the frictional coefficient thereof. This frictional coefficient is not necessarily constant, or determined solely by design parameters; wear and tear, moisture, salt, or stray lubricant may affect the effectiveness, and hence the frictional coefficient of a brake couple structure.

It is a specific advantage of the present invention that to determine $\mu$ and the other values, only the braking pressure and wheel speed are necessary to be sensed—which can be easily and precisely measured in accordance with current technology.

The respectively different wheels of the vehicle may operate on surfaces having different coefficients of friction—for example one wheel may operate on a slick, icy surface, another one, however, on pavement or sanded surface. It is, therefore, desirable to measure the coefficient of rolling friction, $\mu$, at the respective wheels and utilize the respectively calculated $\mu$ separately to control the pressure on the associated wheel, directly based on the calculated or determined coefficient of friction at the time, or a subsequent strobing interval, that is, at a subsequent interval in accordance with a predetermined strobing clock rate. Alternatively, it is possible to obtain an average value of frictional coefficient for all the wheels, and utilize this as the basis. On the driven wheels, a correction factor $-\gamma$ must be introduced.

The relationships for the values of wheel speed, vehicle speed, braking pressure and the like are given, primarily, as non-standardized or uncalibrated, not normalized values; they may, however, be normalized and, if normalized, are so indicated by the subscript N (for "normalized").

In accordance with a feature of one example of the the invention, a linear relationship between frictional coefficient $\mu$ and slippage S is introduced.

The reader is referred to the appendix to the description of this specification for explanation of any symbols used. The notation * associated with any symbols means that the respective value is not normalized, as will be described.

Linear relationship between $\mu$ and slip S:

$$\mu = K_\mu \cdot s + h_\mu \quad (1)$$

$$\text{wherein } K_\mu = K_{\mu(so)} = \frac{d\mu}{ds}\bigg|_{s=so} \text{ and} \quad (1a)$$

$$h_\mu = h_{\mu(so)} = \mu_o - s_o \frac{d\mu}{ds}\bigg|_{s=so} \quad (1b)$$

wherein $s_o$ and $\mu_o$ are operating points on the $\mu$-slip curve.
Converting:

$$\mu = K_2^*(V_F - V_R) + h_\mu \quad (2)$$

with $$K_2^* = \frac{K_\mu}{V_F} \quad (2')$$

For normalized values, the expressions are:

$$\mu = K_2(V_{FN} - V_{RN}) + h_\mu \quad (2a)$$

$$K_2 = \frac{K_\mu}{V_{FN}} \quad (2a')$$

$V_{FN}$ and $V_{RN}$ are normalized or calibrated values with respect to $V_o$. In the equation (2) or (2a), respectively, all non-linearities based on parameter changeable $K_2^*$ or $K_2$ and $h_\mu$, respectively, are removed.

Substituting the equation (2) or (2a), respectively, in the equation (3) for the force equilibrium and torque equilibrium:

$$T_R^* \cdot V_R^* = \mu - K_B^* \cdot P_B \text{ or } T_R \cdot V_{RN} = \mu - K_B \cdot P_{BN} \quad (3)$$

$$\text{with } T_R^* = \frac{\theta_R}{G_F r_R^2} \quad (3a)$$

$$\text{and } T_R = \frac{\theta_R \cdot V_o}{G_F r_R^2} \quad (3b)$$

$$K_B^* = \rho_B \cdot \frac{r_B}{r_R} \cdot \frac{A_B}{G_F} \quad (3c)$$

$$K_B = \rho_B \frac{r_B}{r_R} \cdot \frac{A_B P_o}{G_F} \quad (3d)$$

The foregoing values, looked at for brief periods of time, may be considered constants—see appendix. Thus:

$$T^*_{ERS} \cdot V_R^* + V_R = -V^*_{ERS} \cdot P_B + z^* \quad (4)$$

$$\text{or } T_{ERS} \cdot V_{RN} + V_{RN} = -V_{ERS} \cdot P_{BN} + z, \text{ respectively,} \quad (4a)$$

$$\text{with } T^*_{ERS} = \frac{T_R^*}{K_2^*} \text{ or } T_{ERS} = \frac{T_R}{K_2} \quad (4b)$$

$$V^*_{ERS} = \frac{K_B^*}{K_2^*} \text{ or } V_{ERS} = \frac{K_B}{K_2} \quad (4c)$$

$$z^* = V_F + \frac{h_\mu}{K_2^*} \text{ or } z = V_{FN} + \frac{h_\mu}{K_2}. \quad (4d)$$

Equation (4) is a linear differential equation of the fist order. Since this equation must be processed in an electronic computer, equivalent differential equations (5), normalized, and (5'), not normalized, respectively, are used:

$$V_{R(K+1)} = p_2^* \cdot V_{R(K)} - p_1 {}^* P_{B(K)} + c_1 {}^* bzw. \quad (5')$$

$$V_{RN(K+1)} = p_2 \cdot V_{RN(K)} - p_1 P_{BN(K)} + c_1 \quad (5)$$

The subscripts (K) and (K+1) indicate sequential strobing instants of the computer, spaced by time intervals $T_A$. In equivalent relationships, the terms with the asterisk are not normalized, the terms without the asterisk are normalized. For the parameters $p_1^*$, $p_2^*$ and $c_1^*$ or $p_1$, $p_2$ and $c_1$, respectively, the following relationships pertain:

$$p_2^* = \exp\left(-\frac{T_A}{T^*_{ERS}}\right) \text{ or } p_2 = \exp\left(-\frac{T_A}{T_{ERS}}\right) \quad (6a)$$

or $$p_2^* = 1 - \frac{T_A}{T^*_{ERS}} \text{ or } p_2 = 1 - \frac{T_A}{T_{ERS}} \text{ with} \quad (6b)$$

$$\frac{T_A}{T^*_{ERS}} << 1 \text{ or } \frac{T_A}{T_{ERS}} << 1$$

$$p_1^* = V^*_{ERS}(1 - p_2^*) \text{ or } p_1 = V_{ERS}(1 - p_2) \quad (6)$$

$$c_1^* = z^*(1 - p_2^*) \text{ or } c_1 = z(1 - p_2). \quad (6c)$$

By use of known identification algorithms, for example "least squares with variable forgetting factor", the parameters ($p_1^*$, $p_2^*$, $c_1^*$) or ($p_1$, $p_2$, $c_1$) and can be estimated from the measured values $P_{B(K)}$ and $V_{R(K)}$ or $P_{BN(K)}$ and $V_{RN(K)}$ at the instant of time K.

The notation ∧ characterizes the respective estimated value at a predetermined time instant.

When the values $\hat{p}_1$, $\hat{p}_2$ and $\hat{c}_1$ or $\hat{p}_1^*$, $\hat{p}_2^*$ and $\hat{c}_1^*$ in form of an estimate are obtained, $\mu$ can be calculated by reformulating equation (2) to obtain:

$$\mu = k_2^*\left(\frac{\hat{c}_1^*}{1 - \hat{p}_2^*} - V_R\right) \text{ or } \mu = K_2\left(\frac{\hat{c}_1}{1 - \hat{p}_2} - V_{RN}\right) \quad (7)$$

wherein $$K_2^* = \frac{T_R^*}{T_A}(1 - \hat{p}_2^*) \text{ or } K_2 = \frac{T_R}{T_A} \cdot (1 - \hat{p}_2) \quad (8)$$

is to be used, provided $$(1 - \hat{p}_2^*) \text{ or } (1 - \hat{p}_2) << 1, \quad (8a)$$

otherwise $$K_2^* = \frac{T_R^*}{T_A}(-\ln\hat{p}_2^*) \text{ or } K_2 = \frac{T_R}{T_A} \cdot (-\ln\hat{p}_2) \quad (8b)$$

is to be used.

The values for vehicle speed, $V_F$ or, normalized, $V_{FN}$, respectively, and $k\mu$ can be derived from $\mu$. The frictional coefficient $\rho_B$ of the brake couple structure can be obtained by utilizing $\hat{p}_1^*$ or $\hat{p}_1$, respectively.

DRAWINGS

FIG. 1 is a schematic block diagram of a circuit suitable for carrying out the method of the present invention, in which all elements not necessary for an understanting thereof, or standard in the art of wheel control, have been omitted;

DETAILED DESCRIPTION OF THE SYSTEM

Figure 2A:
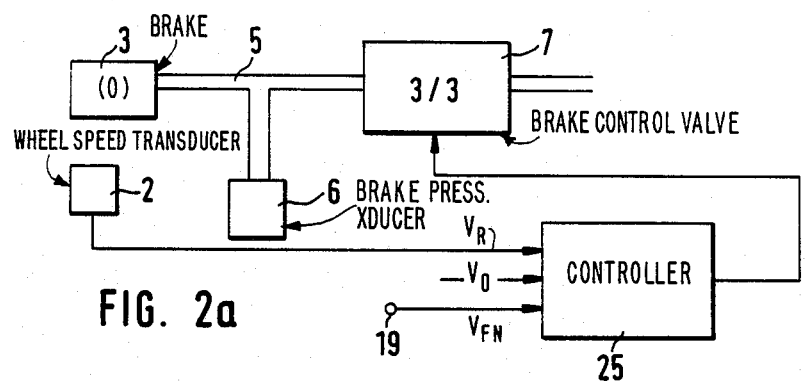
FIG. 2a is a fragmentary diagram showing how the system of FIG. 1 can be modified to form a reference speed useful for slip measurement and to control braking pressure.

A wheel 1, shown schematically, is braked by a brake 3. A wheel speed sensor 2 is coupled to the wheel to provide output signals representative of wheel speed. The brake 3 is operated, for example, from a master brake cylinder 4 via a brake line 5. An operator-controlled brake pedal 4a controls pressure in the brake line 5 which is connected to a brake control apparatus 7, for example a 3/3 magnetic valve which, in its base position, passes pressurized brake fluid, for example under operator control, to the brake 3.

The actual braking pressure, as represented by the pressure of brake fluid in line 5 downstream of the valve 7, is sensed by a brake pressure transducer 6. The wheel speed transducer 2 provides a wheel speed signal $V_R$, representative, instantaneously, of the speed of the wheel to which the speed sensor or transducer 2 is coupled. The brake pressure transducer 6 provides an output signal $P_B$, which is representative of the instaneous brake fluid pressure being applied to the brake 3, and hence of the braking effort.

The values or, rather, the signals representing the values $V_R$ and $P_B$, are connected to a control device 8 and, more specifically, to a estimator 9. The estimator 9, besides the signals $V_R$ and $P_B$, also receives signals representing constant values $V_o$ and $P_o$, for normalizing or calibrating the values $V_R$ and $P_B$. Thus, the estimator 9 forms the normalized signals $V_{RN}$ and $P_{BN}$ and, in accordance with the differential equation (5), provides an estimated value of the parameters $\hat{p}_2$, $\hat{p}_1$ and $\hat{c}_1$ at the respective clock or strobing instants, and provides these values to further circuit components 11, 12, 13. The estimator 9 utilizes known identification algorithms, under control of a clock 10, having clock pulse or strobing pulse intervals $T_A$. Clock 10 also controls the other components of the system 8.

Unit 11 forms the intermediate $$z = \hat{c}_1/(1 - \hat{p}_2) \quad (9).$$

The unit 12 determines the two conditions for the value $K_2$—see equations (8a), (8b) above, in dependence on whether $$(1 - \hat{p}_2) << 1 \quad (10)$$

or not, to form either $$K_2 = (T_R/T_A) \cdot (1 - \hat{p}_2) \quad (8)$$

or, respectively, $$K_2 = (T_R/T_A) \cdot (-\ln\hat{p}_2) \quad (8b).$$

The respectively appropriate or valid value of $K_2$ is provided by the unit 12. To carry out this calculation, it is necessary to introduce the constants $T_R$ and $T_A$—see appendix.

The unit 14, which receives the wheel speed or, rather, the normalized wheel speed $V_{RN}$ from estimator 9, the intermediate z from unit 11 and the respectively appropriate or valid value $K_2$ from unit 12, then carries out the calculation $$\mu = K_2(z - V_{RN}) \qquad (11)$$

Thus, the coefficient of friction $\mu$ is determined. This value is available on terminal 17.

Unit 18 receives the normalized vehicle speed signal determined in a preceding clock or strobing instant $k-1$, namely the signal $V_{FN}(k-1)$, and the value of $\mu$ or an averaged or overall value of $\mu$, $\mu_{ges}$. Unit 18 also receives the constants $T_A$ and $T_F$. Unit 18 determines the instantaneous vehicle speed $V_{FN(k)}$, which is available on terminal 19.

Depending on the requirements for quality of the value of the instantaneous vehicle speed, with respect to actual vehicle speed, it is necessary to calculate the value of the frictional coefficient applied to the unit 18, which is the value $\mu_{ges}$. Block 16 carries out this calculation.

If it is assumed that the vehicle weight is uniformly distributed over all the wheels of the vehicle and the calculation is limited to one wheel, the value $\mu_1$ of the specific wheel, which appears at the input 16a to unit 16, can be used as the value $\mu_{ges}$. In an improved determination of vehicle speed, however, the usually non-uniform distribution of vehicle weight on the respective wheels must be considered. This non-uniform distribution of vehicle weight on the respective wheel is known from the design of the vehicle. The value $\mu_{ges}$ forming the output of unit 16 and being applied to unit 18 is derived as follows:

$$\mu_{ges} = \left( \frac{mF_1}{m} \mu_1 + \frac{mF_2}{m} \mu_2 + \ldots + \frac{mF_n}{m} \mu_n \right) \qquad (12)$$

wherein $m$ is $$m = m_{F_1} + m_{F_2} = \ldots + m_{F_n} \qquad (13)$$

and wherein n is the number of the wheels.

Unit 16, thus, calculates the overall value of $\mu_{ges}$, used on the right side of the equation (12).

The respectively valid or appropriate value $K_2$, determined in unit 12, is also applied to the unit 20, which receives as an input the vehicle speed $V_{FN}$ and provides, at an output 21, by multiplication of vehicle speed and the value $K_2$, the value $K\mu$, which is representative of the slope of the $\mu$ slip curve at the then instantaneous value of $\mu$.

Unit 13 forms the value $K_B$, in dependence on whether the relationship (11) is true or not. Unit 13 receives the constants $T_R$ and $T_A$ and provides, in dependence on whether relationship (11) is true or not, the respective outputs:

$$K_B = \frac{T_R}{T_A} \cdot \hat{p}_1 \qquad (14a)$$

or $$K_B = \frac{T_R}{T_A} \cdot \hat{p}_1 \frac{(-\ln \hat{p}_2)}{1 - \hat{p}_2} \qquad (14b)$$

The output $K_B$ is applied to unit 22 which receives a group of constant values $G_F$, $A_B$, $P_o$, $r_R$, $r_B$, and calculates the frictional value $\rho_B$ of the brake couple structure of the brake 3. The brake frictional value $\rho_B$ is available at output terminal 23.

The system, thus, provides, at respective terminals 17, 19, 21, 23, values for $\mu$, $V_{FN}$, $K\mu$ and $\rho_B$. The values $\mu$, $V_{FN}$ and $K\mu$ can be used in various ways to control braking pressure.

Referring to FIG. 2a, which shows, in fragmentary representation, a portion of the system of FIG. 1: FIG. 2a illustrates the 3/3 valve 7, brake 3, transducer or sensor 2 and the pressure transducer 6. A controller 25, which forms an evaluation circuit, receives the vehicle speed signal $V_{FN}$ from terminal 19. Additionally, controller 25 receives the wheel speed signal $V_R$ from the sensor 2 and the constant $V_o$. The vehicle speed $V_F$ is formed in the controller 25, utilizing $V_o$ and providing a reference speed $V_{Ref}$, which can be used, as well known, together with the wheel speed $V_R$ to control wheel slip. For example, when a predetermined slippage of wheel speed with respect to vehicle speed is sensed, the valve 3 is controlled to lower braking pressure being applied to the brake 3, for example by bleeding brake fluid being applied from the master cylinder. The controller 25 suitably controls the electromagnetically controlled valve 7.

Figure 2B:
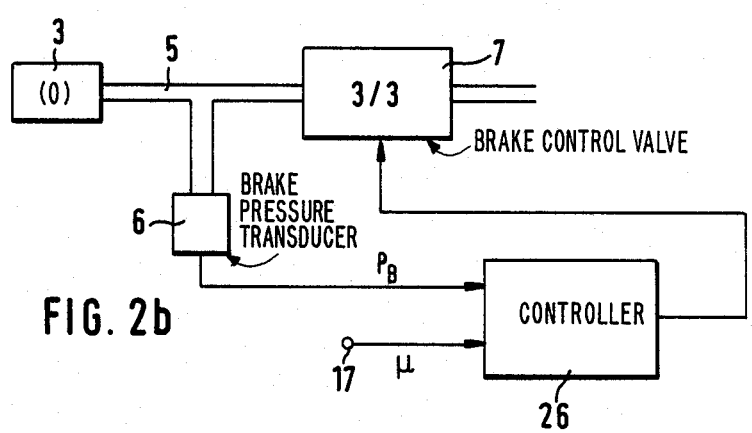
FIG. 2b is a fragmentary diagram showing how the system of FIG. 1 can be modified to control braking pressure directly from the determined $\mu$.

FIG. 2b, again, shows the elements 3 and 5, 6, 7. In accordance with the embodiment of FIG. 2b, the braking pressure is controlled as a function of the derived frictional value $\mu$ from terminal 17 (FIG. 1). The determined $\mu$ is used to control the braking pressure on the brake 3 in such a manner that the magnetic valve 7 is so controlled by controller 26 that the braking pressure is varied by respectively comparing values of actual braking pressure $P_B$ with frictional values, that is, signals from the transducer 6 and compared with signals from terminal 17.

Figure 2C:
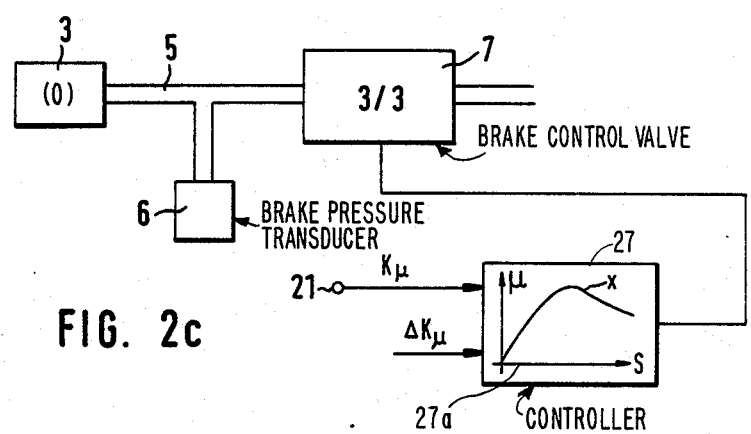
FIG. 2c is a fragmentary diagram showing how the system of FIG. 1 can be modified to control braking pressure in accordance with a slip curve for optimum braking effort.

FIG. 2c shows controller 27 which utilizes the value $K\mu$ from terminal 21 and so controls braking pressure that the operating point is close to, but slightly to the left of a slip curve 27a, shown within the block representing controller 27. In the slip curve, frictional values $\mu$ are shown in the ordinate, and slippage S of a wheel with respect to the road surface is shown on the abscissa. The desired operating point X is close to the maximum, but just slightly to the left of the maximum. At the maximum, $K\mu$ is zero, that is, the slope of the curve is horizontal. In order to provide a slight set-off point before the slope $K\mu$ becomes zero, a small positive slope value $+\Delta K\mu$ is introduced, as schematically shown by the respective input arrow in FIG. 2c.

Figure 3:
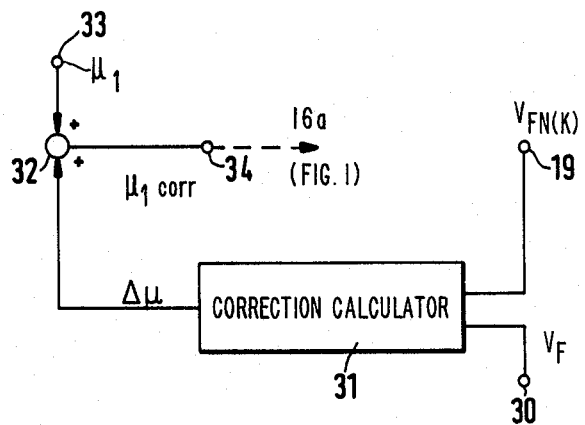
FIG. 3 is a fragmentary diagram of an arrangement which can be used in the system of FIG. 1 to obtain the frictional coefficient $\mu$ and depending values thereof more accurately.

FIG. 3 shows an expansion for the system of FIG. 1, in which the vehicle speed is additionally measured. The calculated vehicle speed $V_{F(K)}$, that is, at an instant of time K, is available on terminal 19 (FIG. 1). This speed value is compared with the value applied to a terminal 30 in which measured vehicle speed $V_F$ is provided, the two terminals 19, 30 being coupled to a correction calculator 31 which forms, by comparison, a correction value $\Delta\mu$. The correction value $\Delta\mu$ is added in an adder 32 to the value $\mu_1$, available at the output of unit 14 (FIG. 1) and, with the correction value added, a value $\mu_{1corr}$ will be available on terminal 34. This corrected value $\mu_{1corr}$ is applied to terminal 16a of the unit 16 of FIG. 1, and is a more accurate value than the value $\mu$. $\mu_1$ or $\mu_{1corr}$, of course, refers to the friction value of wheel No. 1 (o=1).

Figure 4:
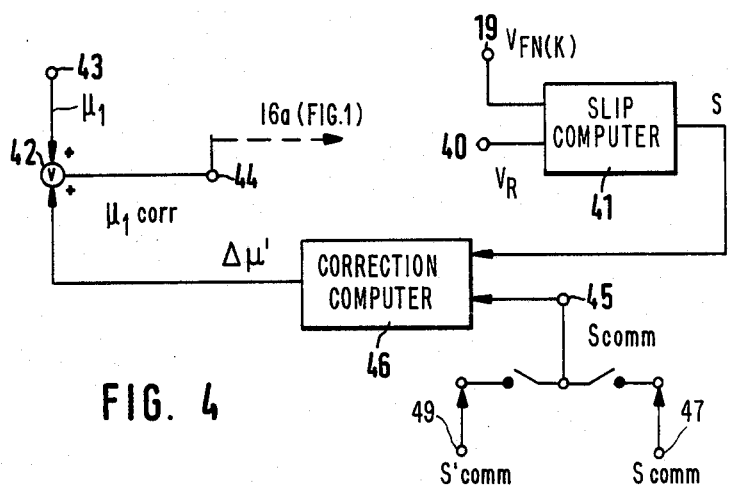
FIG. 4 is a diagram similar to FIG. 3, in which still more accuracy is obtainable.

FIG. 4 illustrates another modification of the system of FIG. 1 which provides a further improvement: The value $\mu$ can be corrected in accordance with FIG. 4 by applying the calculated vehicle speed $V_{F(K)}$, that is, the speed calculated at an instant K and available at terminal 19 to a slip computer 41, where the signal at terminal 19 is compared with the wheel speed signal $V_R$, at terminal 40, to form a slip signal S. This slip signal S is applied to the correction computer 46 which receives, as an input, a command value $S_{comm}$. The value $S_{comm}$ can be applied either from a set value input terminal 47, supplying a fixed command value $S_{comm}$, or a parameter-dependent value $S'_{comm}$ (terminal 49). A parameter which may be used is, for example, a special condition, such as snow or ice, temperature, or any one or more parameter-dependent values. The correction computer 46 compares the slip signal S from slip computer 41 with the command value and provides a correction value $\Delta \mu'$, which is applied to an adder 42. Adder 42 additionally receives at input terminal 43 the value $\Delta \mu_1$, and provides an output correction value $\mu_{1CORR}$. Terminal $\mu_1$ can then be connected to terminal 16a, FIG. 1, to provide a signal corresponding to signal $\mu_{1corr}$, derived from FIG. 3, but with improved accuracy of the value $\mu$, so that a more accurate vehicle speed $V_{FN}$ can then be calculated and be made available at terminal 19.

The system, including the magnetic valve 7, may be part of an ABS, as described in U.S. Pat. Nos. 4,374,421 or 4,504,911. The control of the valve then will be effected as described, for example with reference to FIGS. 2a, 2b, 2c.

The respective units 9 through 20 can be realized by a standard computer, for example of the types Intel 80 186 or Motorola 68 000.

APPENDIX

Table of Symbols

| | |
|---|---|
| $V_F$: | vehicle speed |
| $V_R$: | wheel speed |
| $\omega_R$: | angular wheel speed $\quad$ } $\omega_R \cdot r_R = V_R$ |
| $r_R$: | average radius of the wheel |
| $\theta_R$: | moment of inertia |
| $\mu$: | coefficient of friction |
| $F_R$: | frictional force $\quad$ } $F_R = \mu G_F$ |
| $G_F$: | apportioned vehicle weight |
| m: | mass of the vehicle |
| $m_F$: | apportioned vehicle mass $\quad$ } $G_F = m_F \cdot g$ |
| g: | acceleration of gravity |
| $\mu_B$: | frictional coefficient of brake couple structure |
| $A_B$: | engagement area of brake couple structure |
| $P_B$: | pressure in wheel brake cylinder |
| $F_B$: | brake force $\quad\quad$ ) $F_B = \rho_B \cdot A_B \cdot P_B$ |
| $r_B$: | median engagement radius of brake force |
| S: | wheel slip |
| $\gamma$: | coupling factor of driven wheels through a differential |
| *: | not-normalized value |
| ∧: | estimated value at a certain time instant |
| $T_A$: | clock time or strobe time interval |
| $V_o$: | speed sensor calibrating value |
| $p_o$: | pressure transducer calibrating value |
| $T_F$: | a constant; $\dfrac{V_o}{g}$ |
| $T_R$: | a constant; $\dfrac{\Theta_R \cdot V_o}{G_F \cdot r_R^2}$ |
| $K_2$: | parameter variable; $\dfrac{K_\mu}{V_{FN}}$ |
| $K_B$: | a constant; $S_B \cdot \dfrac{r_B}{r_R} \cdot \dfrac{A_B P_o}{G_F}$ |
| $h\mu$: | $\mu_o - S_o \cdot \dfrac{d\mu}{dt} \mid S = S0$ |
| $K\mu$: | slope; $d\mu/d_s \mid_{s=so}$ |
| $T_{ERS}$: | $T_R/K_2$ |

APPENDIX-continued

Table of Symbols

| | |
|---|---|
| $V_{ERS}$: | $K_B/K_2$ |
| $\mu_o$: | $\mu$ at an operating point |
| $S_o$: | S at an operating point |
| K: | a particular strobing instant |
| K + 1: | the next strobing instant after the particular strobing instant |

We claim:

1. Method of controlling the operation of a wheel forming at least one controlled wheel of a vehicle, comprising the steps of continuously measuring the instantaneous braking pressure $P_B$ being applied to the wheel (1);

continuously measuring the instantaneous rolling speed $V_R$ of the wheel (1);

determining, from said continuously measured braking pressure $P_B$ and wheel speed $V_R$, the instantaneous value of the coefficient of friction $\mu$ between the wheel circumference and the roll-off surface for the wheel; and controlling the level of braking pressure being applied to said wheel based on the determined coefficient of friction $\mu$, wherein the step of determining said coefficient of friction $\mu$ includes the steps of (1) solving, by utilizing the measured values of braking pressure $P_B$ and wheel speed $V_R$, at a strobing instant K and a subsequent strobing instant K+1, one of the linear differential equations:

$$V_{R(K+1)} = p_2^* \cdot V_{R(K)} - p_1^* \cdot P_{B(K)} + c_1^* \quad (1)$$

$$V_{RN(K+1)} = p_2 \cdot V_{RN(K)} - p_1 P_{BN(K)} + c_1 \quad (1N)$$

wherein the subscript N denotes a normalized value and the superscript * denotes a not normalized value; wherein the parameters ($\hat{p}_1^*$, $\hat{p}_2^*$ and $\hat{c}_1^*$) and ($\hat{p}_1$, $\hat{p}_2$ and $\hat{c}_1$), respectively, are estimated; and (2) calculating the coefficient of friction $\mu$ in accordance with the respective relationships:

$$\mu = K_2^* \left( \frac{\hat{c}_1^*}{1 - \hat{p}_2^*} - V_R \right) \text{or, respectively,} \quad (2) \text{ or } (2N)$$

$$\mu = K_2 \left( \frac{\hat{c}_1}{1 - \hat{p}_2} - V_{RN} \right)$$

wherein $$K_2^* = \frac{T_R^*}{T_A} (-\ln \hat{p}_2^*) \text{ or, respectively,} \quad (2a) \text{ or } (2aN)$$

$$K_2 = \frac{T_R}{T_A} \cdot (-\ln \hat{p}_2)$$

or if $$(1 - \hat{p}_2^*) << 1 \text{ or, respectively, } (1 - \hat{p}_2) << 1 \quad (2b) \text{ or } (2bN)$$

then $$K_2^* = \frac{T_R^*}{T_A} (1 - \hat{p}_2^*) \text{ or, respectively,} \quad (2c) \text{ or } (2cN)$$

-continued $$K_2 = \frac{T_R}{T_A} \cdot (1 - \hat{p}_2)$$

wherein $T_A$ is a constant strobing interval;
the instantaneous values ($\hat{p}_2^*$, $\hat{p}_1^*$, $\hat{c}_1^*$) or, respectively, ($\hat{p}_2$, $\hat{p}_2$, $\hat{c}_1$) are estimated values based on measured values of braking pressure $P_B$ or $P_{BN}$, respectively, the wheel speed $V_R$ or $V_{RN}$, respectively and $T_R^*$ or $T_R$, respectively are constant values defined as $$T_R^* \cdot V_R^* = \mu - K_B^* \cdot P_B \text{ or, respectively,} \quad (3) \text{ or } (3N)$$

$$T_R \cdot V_{RN} = \mu - K_B \cdot P_{BN}$$

wherein $$T_R^* = \frac{\theta_R}{G_F r_R^2} \text{ or, respectively, } T_R = \frac{\theta_R \cdot V_o}{G_F r_R^2} \quad (3a) \text{ or } (3aN)$$

wherein $\theta_R$ is the moment of inertia of the wheel (1), $G_F$ the weight of the vehicle or a portion to the specific wheel and $r_R$ the mean radius of the wheel.

2. The method of claim 1, including the step of calculating the vehicle speed $V_{F(K)}$ at the instant K, in accordance with the relationship:

$$V_{F(K)} = V_{F(K-1)} - \frac{T_A}{T_F^*} \cdot \mu \quad (4)$$

wherein $V_{V(K-1)}$ is the previously determined vehicle speed and $T^*_F = (1/g)$, wherein g is the acceleration of gravity.

3. The method of claim 2, wherein the slope of the frictional coefficient versus slip from a slip curve is determined by:

$$\frac{d\mu}{dS} = K_\mu = K_2^* \cdot V_F \quad (5)$$

4. The method of claim 1, including the step of calculating the frictional coefficient of the stationary-rotary brake couple structure ($\rho_B$) in accordance with the relationship:

$$\rho_B = \frac{r_R}{r_B} \cdot \frac{G_F}{A_B} \cdot K_B^* \quad (6)$$

wherein $K_B^*$ $$K_B^* = \frac{T_R^*}{T_A} \cdot p_1^* \quad (6a)$$

provided $$(1 - \hat{p}_2^*) < < 1 \quad (6b)$$

and $$K_B^* = \frac{T_R^*}{T_A} \frac{\hat{p}_1^*}{1 - \hat{p}_2^*} \cdot (-\ln p_2^*) \quad (6c)$$

if the relationship (6b) is not met,
and wherein $r_B$ is the median radius of engagement of the braking force, and $A_B$ the area of engagement of the stationary-rotary brake couple structure.

5. The method of claim 1, including the step of determining the value $\mu_2$ for a plurality of wheels; and
calculating the overall coefficient of friction ($\mu_{ges}$) for the vehicle with respect to the roll-off surface by associating the weight distribution of the vehicle with respect to the respective wheels in accordance with the relationship:

$$\left( \mu_{ges} = \frac{m_{F1}}{m} \cdot \mu_1 + \frac{m_{F2}}{m} \mu_2 + \ldots \frac{m_{Fn}}{m} \mu_n \right), \quad (7)$$

wherein m is the overall mass of the vehicle, $m_{F1}$, $m_{F2}$ ... $m_{Fn}$ is the apportioned mass of the vehicle with respect to a specific wheel (1, 2 ... n) and $\mu_1, \mu_2 \ldots \mu_n$ is the respective coefficient of friction of the respective wheel (1, 2 ... n), and $1 < i < n$.

6. The method of claim 5, further including the step of weighting the respective value of the coefficient of friction ($\mu$) of two driven wheels which are coupled by a differential, by including a deductive coupling value ($\gamma$).

7. The method of claim 1, wherein the level of braking pressure being applied to said wheel is controlled directly in accordance with the determined coefficient of friction ($\mu$).

8. The method of claim 2, further including the step of controlling slippage of a driven wheel by selectively braking said driven wheel,
including the step of comparing the speed of the driven wheel speed ($V_R$) with a reference speed ($V_{ref}$);
and further including the step of obtaining the reference speed from vehicle speed ($V_F$), or a normalized or calibrated vehicle speed ($V_{FN}$).

9. The method of claim 1, including the steps of measuring vehicle speed ($V_F$);
comparing the measured and calculated vehicle speed $V_{F(K)}$ at an instant (K), and obtaining, from the comparison, a correction value ($\Delta\mu$);
and modifying the value of the coefficient of friction $\mu$ by said correction value.

10. The method of claim 1, including the step of comparing vehicle speed $V_{F(K)}$ at an instant of time (K) with the wheel speed ($V_R$) to obtain a slip value (S);
and comparing said slip value (S) with a command value ($S_{comm}$), to obtain a correction value ($\Delta\mu'$) for the coefficient of friction ($\mu$), and modifying the coefficient of friction ($\mu$) by said correction value ($\Delta\mu'$).

11. The method of claim 10, wherein said slip command value ($S_{comm}$) is variable in dependence on vehicle operation, of operating condition parameters.

12. The method of claim 3, including the step of determining the slope of the wheel slip curve defining wheel slippage over the rolling surface vs. frictional coefficient ($d\mu/dS$);
and controlling the level of braking pressure applied to said wheel to operate said wheel with a frictional coefficient just short of the maximum frictional coefficient as defined by the wheel slip curve to cause operation of the brake of the wheel, with respect to the wheel slip curve, just below the point at which the differential of the wheel slip curve becomes zero.

13. A system for controlling braking operation of a wheel forming at least one controlled wheel of a vehicle, comprising
   means (6) for continuously measuring the instantaneous braking pressure $P_B$ being applied to the wheel (1);
   means (2) for continuously measuring the instantaneous rolling speed $V_R$ of the wheel (1) over a roll-off surface;
   means for determining, from said continuously measured braking pressure $P_B$ and wheel speed $V_R$, the instantaneous value of the coefficient of friction $\mu$ between the wheel circumference and the roll-off surface of the wheel; and
   means (7) for controlling the level of braking pressure being applied to said wheel based on the determined coefficient of friction $\mu$,
   wherein said determining means for determining said coefficient of friction $\mu$ includes
   (1) means for solving, by utilizing the measured values of braking pressure $P_B$ and wheel speed $V_R$, at a strobing instant K and a subsequent strobing instant K+1, one of the linear differential equations:

$$V_{R(K+1)} = p_2^* \cdot V_{R(K)} - p_1^* \cdot P_{B(K)} + c_1^* \qquad (1)$$

$$V_{RN(K+1)} = p_2 \cdot V_{RN(K)} - p_1 P_{BN(K)} + c_1 \qquad (1N)$$

wherein the subscript N denotes a normalizing value and the superscript * denotes a not normalized value; wherein the parameters ($\hat{p}_1^*$, $\hat{p}_2^*$ and $\hat{c}_1^*$) and ($\hat{p}_1$, $\hat{p}_2$ and $\hat{c}_1$), respectively, are estimated; and
   (2) means (14) for calculating the coefficient of friction $\mu$ in accordance with the respective relationships:

$$\mu = K_2^* \left( \frac{\hat{c}_1^*}{1 - \hat{p}_2^*} - V_R \right) \text{ or, respectively,} \qquad (2) \text{ or } (2N)$$

$$\mu = K_2 \left( \frac{\hat{c}_1}{1 - \hat{p}_2} - V_{RN} \right)$$

wherein $$K_2^* = \frac{T_R^*}{T_A} (-\ln\hat{p}_2^*) \text{ or, respectively,} \qquad (2a) \text{ or } (2aN)$$

$$K_2 = \frac{T_R}{T_A} \cdot (-\ln\hat{p}_2)$$

or if $$(1 - \hat{p}_2^*) << 1 \text{ or, respectively, } (1 - \hat{p}_2) << 1 \qquad (2b) \text{ or } (2bN)$$

then $$K_2^* = \frac{T_R^*}{T_A} (1 - \hat{p}_2^*) \text{ or, respectively,} \qquad (2c) \text{ or } (2cN)$$

$$K_2 = \frac{T_R}{T_A} \cdot (1 - \hat{p}_2)$$

wherein
clock means (10) are provided furnishing strobing pulses at constant strobing intervals $T_A$; wherein the instantaneous values ($\hat{p}_2^*$, $\hat{p}_1^*$, $\hat{c}_1^*$) or, respectively, ($\hat{p}_2$, $\hat{p}_1$, $\hat{c}_1$) are estimated values based on measured values of braking pressure $P_B$ or $P_{BN}$, respectively, and wheel speed $V_R$ or $V_{RN}$, respectively; and
$R_R$ or $T_R$, respectively are constant values defined as $$T_R^* \cdot V_R^* = \mu - K_B^* \cdot P_B \text{ or, respectively,} \qquad (3) \text{ or } (3N)$$

$$T_R \cdot V_{RN} = \mu - K_B \cdot P_{BN}$$

wherein $$T_R^* = \frac{\theta_R}{G_F r_R^2} \text{ or, respectively, } T_R = \frac{\theta_R \cdot V_o}{G_F r_R^2} \qquad (3a) \text{ or } (3aN)$$

and wherein $\theta_R$ is the moment of inertia of the wheel (1), $G_F$ the weight of the vehicle or a portion to the specific wheel and $r_R$ the mean radius of the wheel.

14. The system of claim 13, wherein said determining means includes means for
   calculating the vehicle speed $V_{F(K)}$ at the instant K, in accordance with the relationship:

$$V_{F(K)} = V_{F(K-1)} - \frac{T_A}{T_F^*} \cdot \mu \qquad (4)$$

wherein $V_{F(K-1)}$ is the previously determined vehicle speed and $T^*_F = (1/g)$, wherein g is the acceleration of gravity.

15. The system of claim 14, wherein the slope of the frictional coefficient versus slip from a slip curve is determined by:

$$\frac{d\mu}{dS} = K_\mu = K_2^* \cdot V_F \qquad (5)$$

16. The system of claim 13, wherein said determining means includes means for calculating the frictional coefficient of the stationary-rotary brake couple structure ($\rho_B$) in accordance with the relationship:

$$\rho_B = \frac{r_R}{r_B} \cdot \frac{G_F}{A_B} \cdot K_B^* \qquad (6)$$

wherein $K_B^*$ $$K_B^* = \frac{T_R^*}{T_A} \cdot \hat{p}_1^* \qquad (6a)$$

provided $$(1 - \hat{p}_2^*) << 1 \qquad (6b)$$

and $$K_B^* = \frac{T_R^*}{T_A} \frac{\hat{p}_1^*}{1 - \hat{p}_2^*} \cdot (-\ln\hat{p}_2^*) \qquad (6c)$$

if the relationship (6b) is not met,
   and wherein $r_B$ is the median radius of engagement of the braking force, and $A_B$ the area of engagement of the stationary-rotary brake couple structure.

17. The system of claim 13, including means for determining the value $\mu_1$ for a plurality of wheels; and
   means for calculating the overall coefficient of friction ($\mu_{ges}$) for the vehicle with respect to the roll-off surface by associating the weight distribution of the vehicle with respect to the respective wheels in accordance with the relationship:

$$\left(\mu_{ges} = \frac{m_{F1}}{m} \cdot \mu_1 + \frac{m_{F2}}{m} \mu_2 + \ldots \frac{m_{Fn}}{m} \mu_n\right), \quad (7)$$

wherein m is the overall mass of the vehicle, $m_{F1}$, $m_{F2}$ ... $m_{Fn}$ is the apportioned mass of the vehicle with respect to a specific wheel (1, 2 ... n) and $\mu_1, \mu_2 \ldots \mu_n$) and $\mu_1, \mu_2 \ldots \mu_n$ is the respective coefficient of friction of the respective wheel (1, 2 ... n), and $1 < i < n$.

* * * * *